United States Patent [19]

Lin

[11] 4,403,369
[45] Sep. 13, 1983

[54] INTERNAL CADDY CLEANING APPARATUS

[75] Inventor: Peter T. Lin, East Brunswick, N.J.

[73] Assignee: RCA Corporation, New York, N.Y.

[21] Appl. No.: 314,906

[22] Filed: Oct. 26, 1981

[51] Int. Cl.³ .............................................. A47L 5/14
[52] U.S. Cl. ....................................... 15/304; 15/94; 15/311; 15/345
[58] Field of Search ................. 15/94, 304, 310, 311, 15/345, 346

[56] References Cited

U.S. PATENT DOCUMENTS

| 3,713,987 | 1/1973 | Paik et al. | 195/127 |
| 3,733,639 | 5/1973 | Timian | 15/304 |
| 4,213,223 | 7/1980 | Cosby | 15/304 |
| 4,239,108 | 12/1980 | Coleman et al. | 206/312 |

Primary Examiner—Chris K. Moore
Attorney, Agent, or Firm—E. M. Whitacre; J. S. Tripoli; D. A. Kulkarni

[57] ABSTRACT

The walls of a video disc caddy are vibrated at or near their resonant frequency to dislodge foreign matter adhering to the inside surfaces of the walls. The separated foreign matter is collected by the pressurized air circulating inside the caddy enclosure, and removed therefrom by means of a vacuum.

10 Claims, 7 Drawing Figures

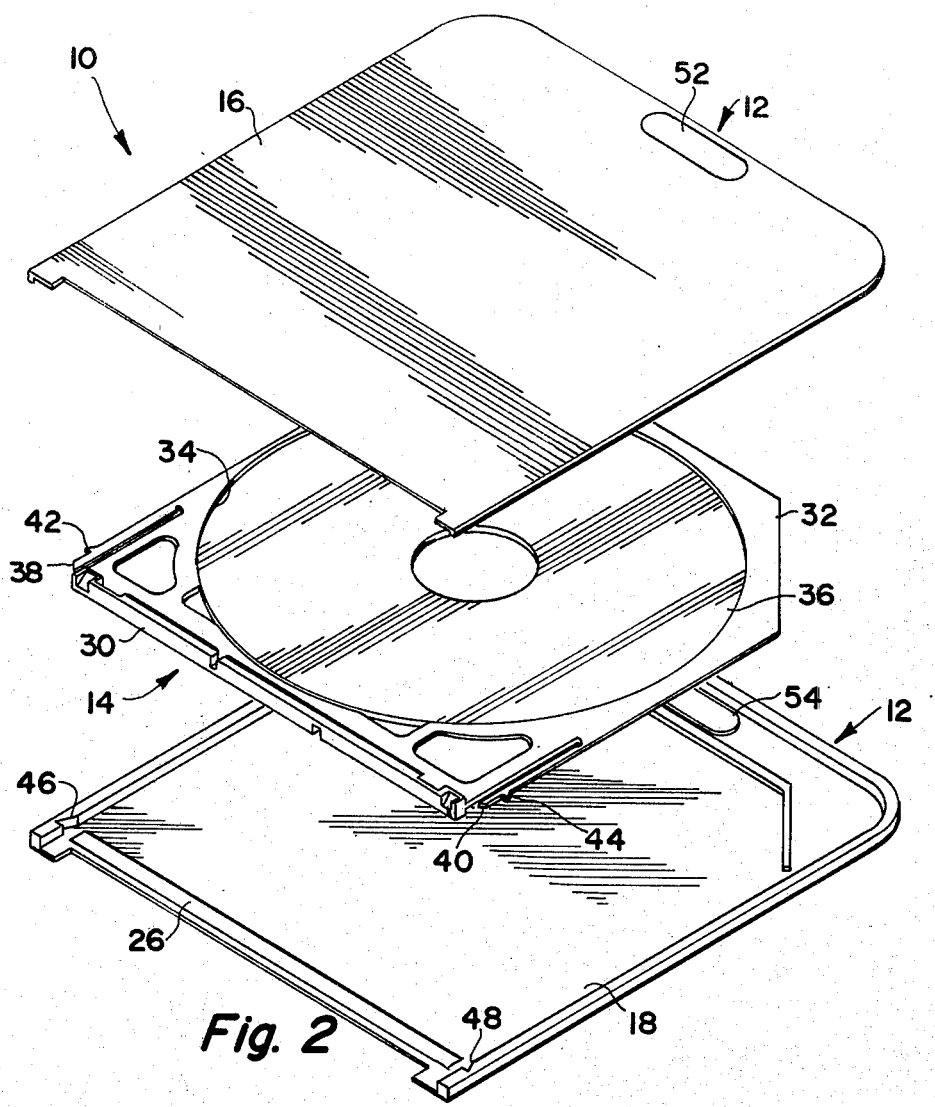
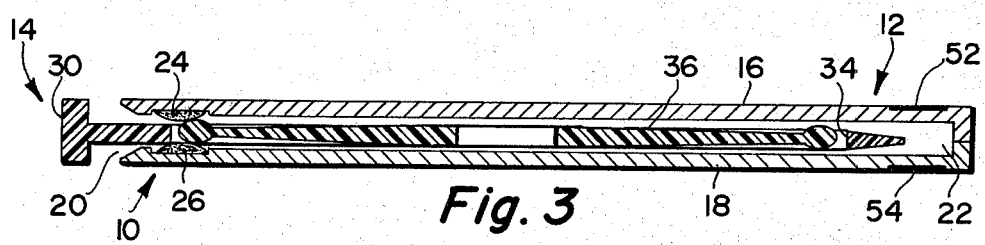

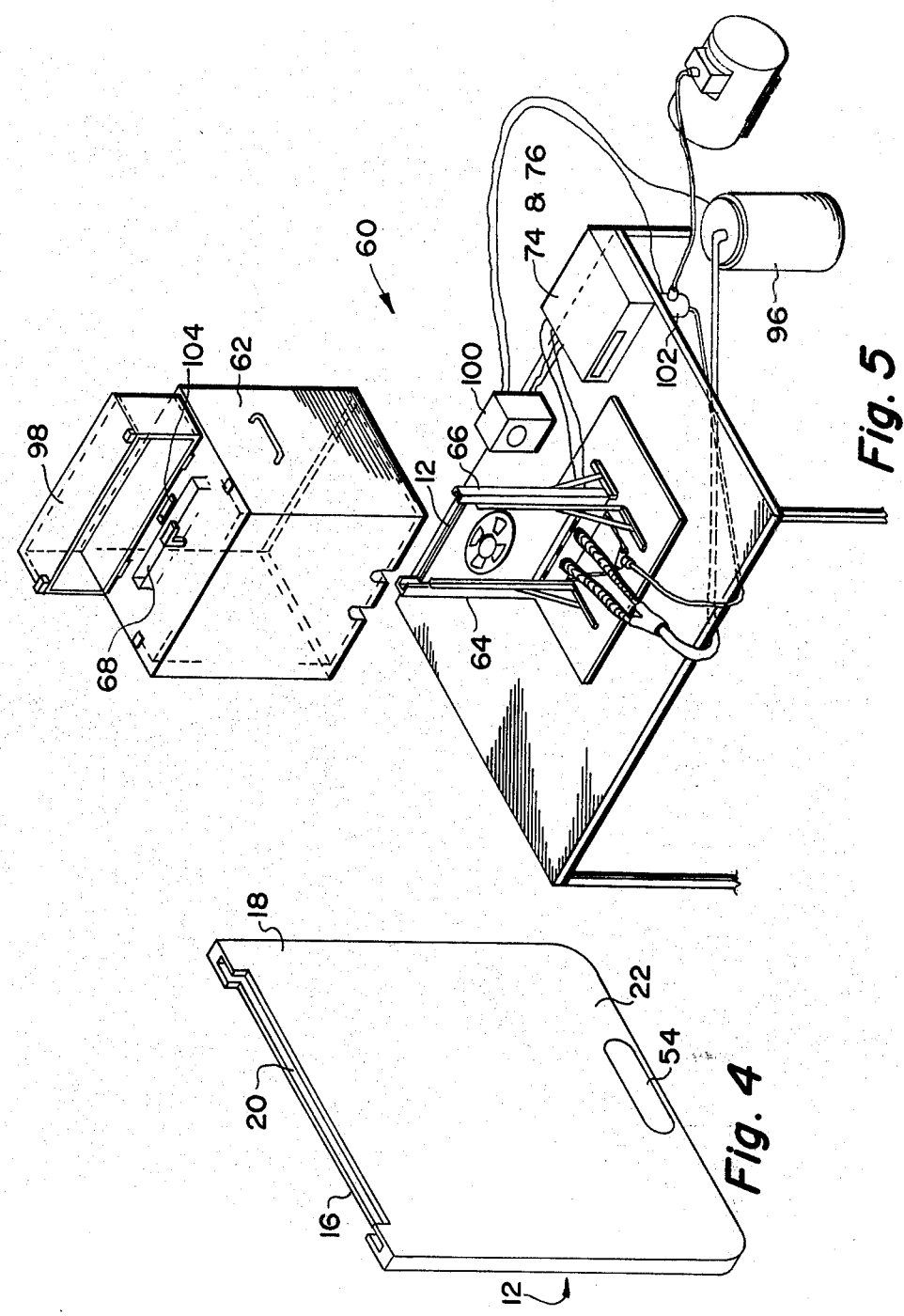

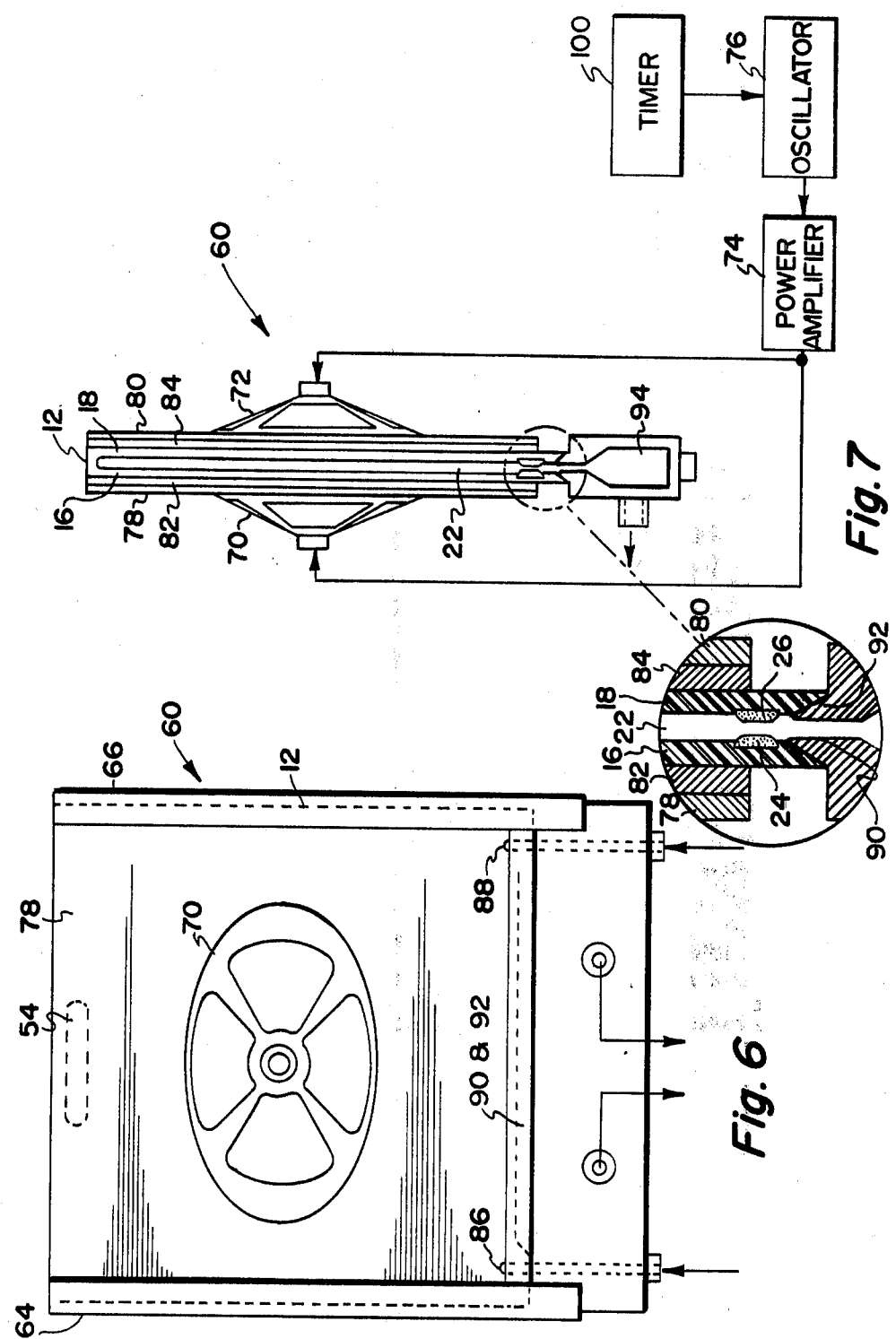

INTERNAL CADDY CLEANING APPARATUS

This invention generally relates to an apparatus for cleaning a narrow space structural enclosure, and more particularly, it pertains to an apparatus for cleaning the internal surfaces of a video disc caddy.

In certain video disc systems, information is stored on a disc record in the form of minute geometric variations in the bottom of a continuous spiral groove disposed on the record surface. The variations in capacitance between an electrode carried by a groove-riding stylus and a conductive property of the record are sensed to reproduce the stored information. The video disc is enclosed in a planar protective caddy. The caddy comprises an outer sleeve formed by a pair of flat panels defining an edge opening in communication with a record enclosing cavity, and a record retaining spine having an opening for receiving a record. The record/spine assembly is subject to disposition in the record enclosing cavity. A pair of lip seals are disposed on the inner surfaces of the sleeve along the edge opening thereof to keep foreign matter from entering into the record enclosing cavity. The record remains within its protective caddy except when it is inside a record player. To load a record into the player, a full caddy is inserted into the player and the sleeve is extracted therefrom to leave the record/spine assembly inside the player. To retrieve the record, an empty sleeve is reinserted into the player to pick up the record/spine assembly. U.S. Pat. No. 4,239,108, issued to Coleman et al., illustratively describes a video disc caddy and a caddy extraction system.

Because of the minuteness of the modulation typically impressed on a video-type disc record (e.g., groove width=2.5 micrometers, groove depth=approximately 0.5 micrometers, signal element length=0.25 to 0.75 micrometers), such records are sensitive to contamination. Dust, debris or foreign matter on the record could cause the pickup stylus to lift away from the record during playback, resulting in signal loss at the output of the pickup. It is, therefore, essential that both the record and the caddy are both free from contamination.

It is difficult to clean the interior surfaces of the caddy enclosure because of its narrow dimensions (e.g., the spacing between the caddy panels=0.090 to 0.130 inches). The apparatus, in accordance with this invention, provides an effective technique for cleaning the inner surfaces of the caddy enclosure. The subject apparatus includes means applied to the outer surfaces of the caddy panels to cause excitation thereof near their resonant frequency to separate any foreign matter from the internal surfaces of the panels. A pair of spaced nozzles direct jets of air into the record enclosing cavity to collect the separated foreign matter. The record enclosing cavity is connected to a vacuum chamber for removing the collected foreign matter away from the cavity.

In the drawings:

FIG. 2 shows an exploded view of the video disc caddy of FIG. 1;

FIG. 3 depicts a cross sectional view of the video disc caddy of FIGS. 1 and 2;

FIG. 4 is an isometric view of the outer jacket of the video disc caddy of FIGS. 1, 2 and 3;

FIG. 5 represents a perspective view of an internal caddy cleaning apparatus pursuant to the instant invention; and FIGS. 6 and 7, respectively, show a front view and a side view of the subject caddy cleaning apparatus.

Figure 1:
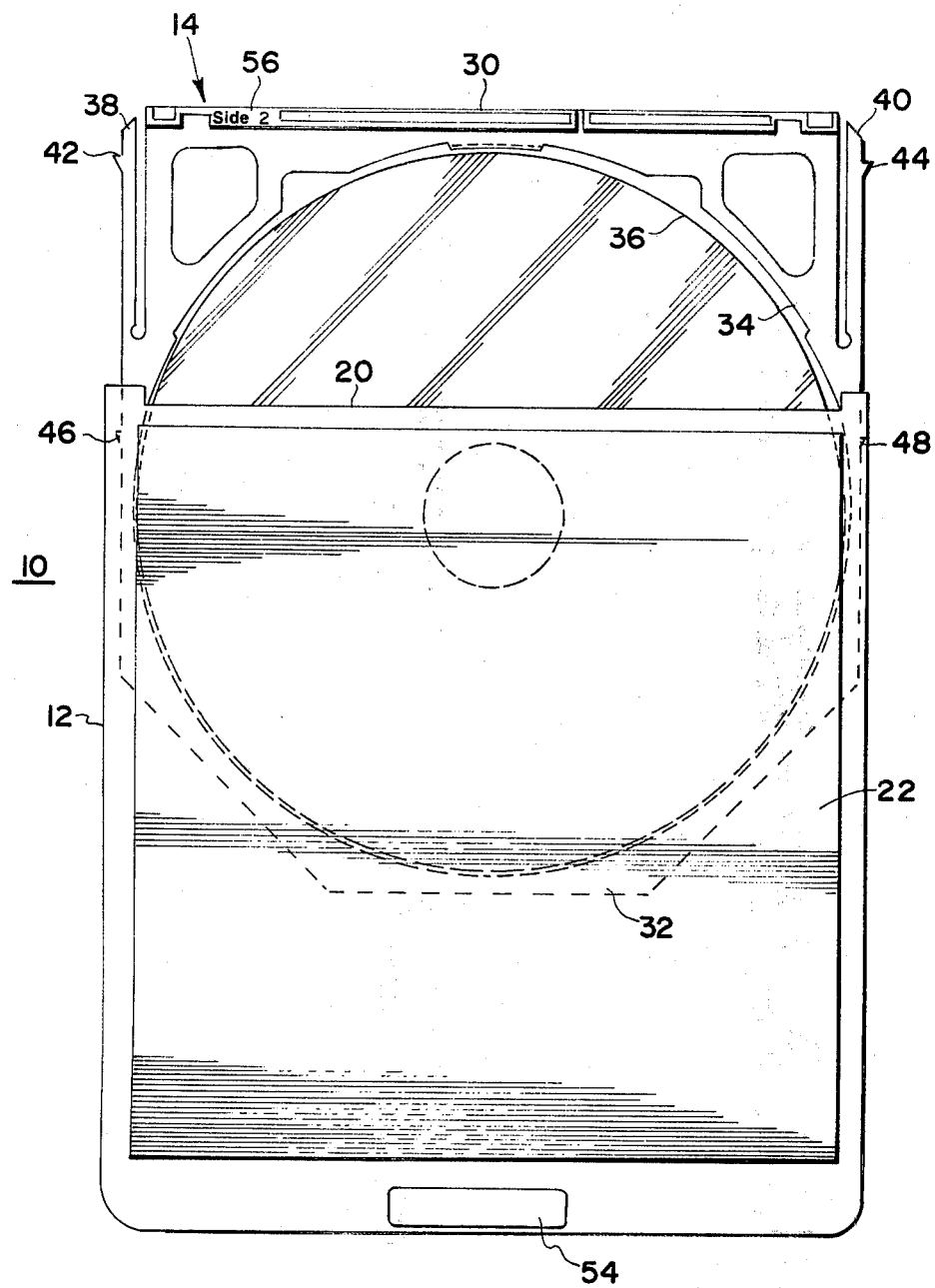
FIG. 1 illustrates a video disc caddy comprising an outer jacket and an inner record retaining spine; the caddy being suitable for use in the practice of the present invention.

In FIGS. 1, 2 and 3, a flat video disc caddy 10, suitable for use in the practice of this invention, is shown. The caddy 10 comprises an outer jacket 12 and an inner record retaining spine 14. The jacket 12 consists of a pair of plastic panels 16 and 18, illustrated more clearly in FIG. 2, which are ultrasonically welded to each other along three sides thereof to form a narrow edge opening 20 along the remaining side in communication with a record enclosing cavity 22. The caddy jacket 12, which serves as a protective enclosure for a record, is shown in FIG. 4. A pair of lip pads 24 and 26 are secured to the interior surfaces of the panels 16 and 18 along the edge opening 20 to form a dust seal. The lip pads 24 and 26 are arranged such that the record is wiped each time it enters and exits the jacket 12.

The record retaining spine 14 is comprised of a portion 30 which serves as a closure, and a further portion 32 which has an opening 34 for receiving a video disc record 36. The record/spine assembly is removably received into the jacket 12. The spine 14 is provided with a pair of integrally-molded, flexural latch fingers 38 and 40. The spine latch fingers 38 and 40 are respectively fitted with protruding elements 42 and 44. The protruding elements 42 and 44 are subject to reception in the respective pockets 46 and 48 disposed in the jacket 12 for locking the spine 14 in place to prevent an enclosed record from inadvertently falling out. As previously indicated, a record remains inside its caddy except when it is being played. The record is loaded into, and removed from, the player without any direct handling of the record by the user.

The exterior surfaces of the panels 16 and 18 are provided with recessed areas 52 and 54 to form a finger grip. The spine 14 is provided with record side identifying indicia 56 to indicate the record side. The caddy has a number of other features which are not essential for the consideration of the instant invention, and, therefore, will not be described here in the interest of brevity.

The caddy panels 16 and 18 and the spine 14 are injection molded from polystyrene. The lip seals 24 and 26 are fabricated from DuPont made Sontara material which is treated with an antiwicking agent to protect the lubricant on the record surface.

As indicated above, the video disc is sensitive to contamination. Not only must the disc be free from dust and debris, but its protective enclosure must be clean. It is difficult to clean the interior surfaces of the caddy jacket 12 because of its narrow construction. The separation between the two panels 16 and 18 is on the order of 0.090 to 0.130 inches. A caddy cleaning apparatus 60, in accordance with the subject invention, provides an effective technique for cleaning the inside of a narrow enclosure, such as a caddy jacket.

The subject caddy cleaning apparatus 60 will now be described in greater detail with the aid of FIGS. 5-7. FIG. 5 is a perspective view of the caddy cleaning apparatus 60. The cabinet 62 of the caddy cleaning apparatus 60 is shown in a raised position to reveal the underlying details. The apparatus 60 includes a pair of guide ways 64 and 66 for supporting a jacket during its cleaning. An empty jacket is inserted through a slot 68 provided in the top wall of the cabinet 62 along the guide ways 64 and 66, in the manner indicated in FIG. 6, to load it into the machine.

The caddy cleaning apparatus 60 further includes a pair of speakers 70 and 72, better shown in FIG. 7, for exciting the jacket panels 16 and 18 at or near their resonant frequency (e.g., 50 to 70 cps). The speakers 70 and 72 are driven by a power amplifier 74 coupled to an oscillator 76. Each of the speakers 70 and 72 is equipped with a board 78 made from wood. The boards 78 and 80 are, in turn, respectively fitted with resilient pads 82 and 84 to protect the jacket during loading and unloading operations. Additionally, the padded boards 78 and 80 assure a good coupling between the speakers 70 and 72 and the respective caddy walls 16 and 18. The vibrations of the panels 16 and 18, at or near their resonant frequency, cause any foreign matter attached to their inner surfaces to break loose therefrom.

The subject apparatus 60 further includes a pair of nozzles 86 and 88 which direct jets of pressurized ambient atmospheric air (e.g., 50–80 psig) into the record enclosing cavity of the jacket. The heads of the nozzles 86 and 88 protrude into the jacket cavity through the edge opening when the jacket is loaded into the cleaning apparatus. The injected pressurized air generates a wide range of high frequency vibrations of the caddy panels (i.e., up to about 10,000 cps) on top of the low frequency oscillations set up by the speakers 70 and 72 to aid the separation of any foreign matter adhering to the internal walls of the caddy. The air circulating inside the jacket cavity further serves to collect any dislodged foreign matter for subsequent removal.

When the jacket is loaded into the cleaning apparatus 60, a pair of stainless steel guide bars 90 and 92 disposed on the top of a vacuum chamber 94 engage the edge opening of the jacket, in the manner indicated in FIG. 7, to spread open the lip seal to hook up the record enclosing cavity with the vacuum chamber. The vacuum chamber 94 is connected with a vacuum pump 96 which generates a static suction pressure of about 50.5 inches of water. The vacuum pump 96 pumps out the pressurized air circulating inside the cavity carrying the loose trapped particles. The dust and debris thus removed from the interior of the jacket is separated from the air and collected by the vacuum pump 96 for subsequent disposition.

The caddy loading slot 68 of the cabinet 62 is fitted with a hinged cover 98 to prevent any suspended atmospheric particulate matter from getting into the system. The cabinet 62 is further equipped with a latch 104 for holding a loaded jacket against the spreader bars 90 and 92. A timer 100 is provided to automatically turn off the cleaning sequence at the end of a preset time interval. As shown in FIG. 5, the timer 100 is connected to the oscillator 76, the vacuum pump 96, and the solenoid air valve 102. The entire cleaning cycle lasts from 20 to 45 seconds. The jacket is unloaded from the machine upon completion of the cleaning sequence. The subject apparatus has been found to effectively remove trapped foreign particles from the inside of the caddy jacket.

Any suitable components may be used for the cleaning apparatus. Illustrative component specifications are as follows.

TABLE OF VALUES

| COMPONENT | SPECIFICATION |
| --- | --- |
| (1) Speakers 70 & 72: | Heavy duty 10 inch, 8 ohm, 25 watt woofer, Model No. 10C10FE, made by Quam-Nicholis Co., Chicago, Illinois. |
| (2) Power Amplifier 74: | Two channel, 75 watts per channel, power amplifier, Model No. 170 DC, made by Marantz. |
| (3) Oscillator 76: | Function Generator, Model No. HP3311A, made by Hewlett Packard. |
| (4) Air: | 50 to 80 psig standard industrial air. |
| (5) Vacuum Pump 96: | Model No. 2Z972B made by Dayton Electric Co., static suction pressure - 50.5 inches of water, air volume - 90 cft/minute. |
| (6) Timer 100: | Model No. MET-R-100-115A, made by Quardian Electric Co., timing range 0.5–100 seconds. |

What is claimed is:

1. An apparatus for cleaning an enclosure formed by a pair of spaced panels defining an edge opening in communication with a cavity comprising:
   (A) a housing for receiving said enclosure;
   (B) means in communication with the external surfaces of said panels for causing excitation thereof;
   (C) means coupled to said edge opening for directing a jet of pressurized fluid into said cavity; and
   (D) means subject to engagement with said edge opening for connecting said cavity to a vacuum chamber for removing dislodged foreign matter from said cavity.

2. The apparatus as defined in claim 1 wherein said fluid comprises pressurized ambient atmospheric air.

3. The apparatus as defined in claim 1 wherein said excitation causing means causes said panels to vibrate near their resonant frequency.

4. The apparatus as defined in claim 1 for use with said enclosure wherein said cavity is normally closed by a pair of lip pads disposed on said internal surfaces of said panels along said edge opening; said apparatus further including means subject to entry into said edge opening for forcing said lip pads to open to cause said cavity to communicate with said vacuum chamber when said enclosure is loaded into said housing.

5. The apparatus as defined in claim 1 wherein said excitation causing means comprises a pair of spaced speakers coupled to a power supply; each of said speakers being fitted with a plate subject to engagement with the external surface of a respective one of said panels upon reception of said enclosure in said housing.

6. The apparatus as defined in claim 5 wherein each of said plates is lined with a resilient pad to protect said panels during loading and unloading operations.

7. The apparatus as defined in claim 6 wherein said plates are made from wood.

8. The apparatus as defined in claim 1 wherein said housing includes a pair of guide ways along which said enclosure is inserted for cleaning.

9. The apparatus as defined in claim 1 wherein said jet directing means comprises a pair of spaced nozzles coupled to a pressurized air supply, and adapted for passage into said cavity when said enclosure is loaded into said housing.

10. The apparatus as defined in claim 1 further including a source of vacuum connected to said vacuum chamber.

* * * * *